United States Patent Office 3,702,282
Patented Nov. 7, 1972

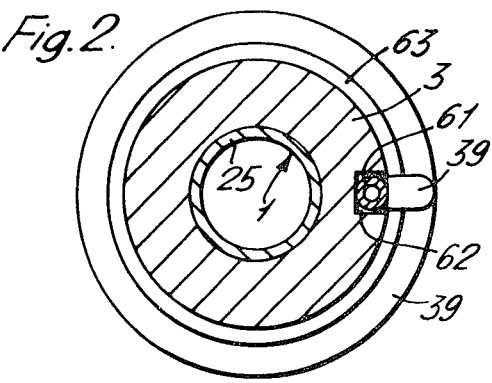
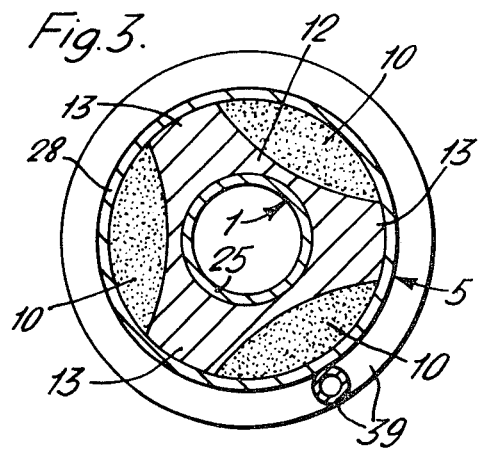
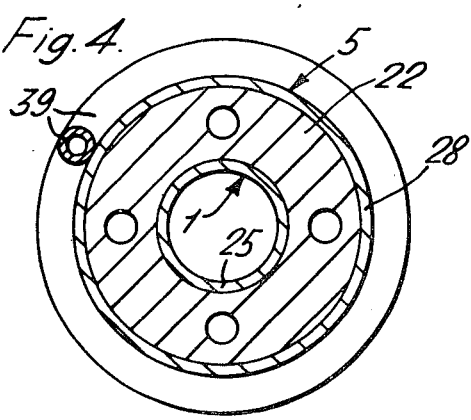
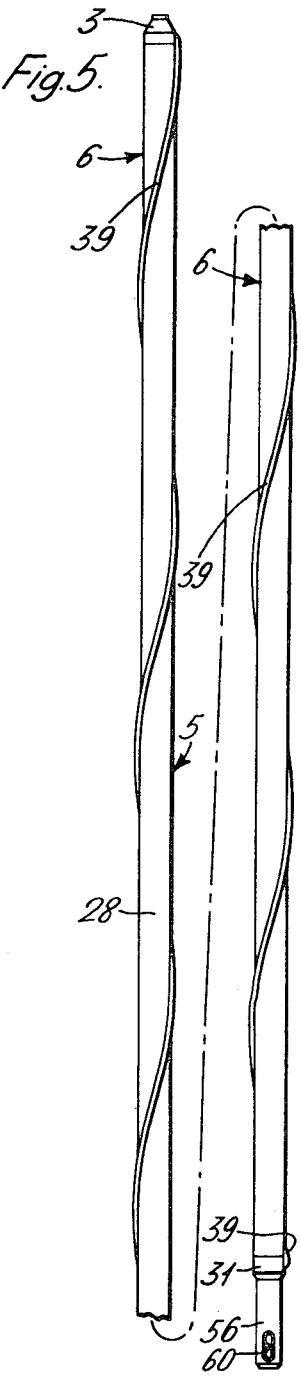

3,702,282
NUCLEAR REACTOR FUEL ELEMENTS
John Andrew Gatley, Knutsford, and George Oliver Jackson, Timperley, Cheshire, England, assignors to United Kingdom Atomic Energy Authority, London, England
Filed Nov. 26, 1968, Ser. No. 779,066
Claims priority, application Great Britain, Dec. 20, 1967, 57,972/67
Int. Cl. G21c 3/18
U.S. Cl. 176—68    5 Claims

ABSTRACT OF THE DISCLOSURE

A fuel pin for a fuel element of a nuclear reactor (for example of the sodium cooled fast breeder type) is of the elongate tubular type having its inner and outer sheaths sealingly secured together at one end and at the other end having first and second sealing means in spaced adjacent relationship to one another and each allowing relative longitudinal movement between the two sheaths. A duct provides a vent path to the outside of the fuel pin from the space between the two sheaths and bounded by the two sealing means. The duct is conveniently provided by a capillary tube helically coiled about the outside of the fuel pin and terminating at that end of the fuel pin which is remote from the two sealing means.

BACKGROUND OF THE INVENTION

This invention relates to nuclear reactor fuel elements, and in particular to that kind of fuel element, commonly called a fuel pin which term will be employed hereafter, which has an internal and an external sheath with fuel material contained in the annular space between the two sheaths. This type of fuel pin is known in the art as a tubular fuel pin. It is advantageous because it allows coolant to flow internally along the pin as well as externally, and mitigates to some extent the difficulties of poor thermal conductivity of ceramic nuclear fuels such as uranium dioxide or a mixture of uranium and plutonium dioxides, and centre melting which can take place with highly rated fuel in solid cylindrical form. Its main disadvantage lies in the fact that allowance has to be made for a degree of differential expansion between the inner and outer sheathing during operation. Although it will be possible to design so that the midwall temperatures of the inner and outer sheaths are within a few degrees of one another during normal operation, the following two factors are expected to produce differential expansion. Firstly, the fuel expands longitudinally as well as radially during operation, and it is very likely that the fuel will be more rigidly coupled to one sheath than to the other, thus straining it to a greater degree. Secondly, transient effects will probably be significant, and on shut-down of the reactor, ceramic fuel will tend to contract radially more than the sheaths, and a gap will probably open up between the fuel and the outer sheath. This will act as a thermal insulation and on increasing power, the heat balance will be upset. The same effect may be evidenced on reducing power. Upset in the heat balance will result in differing inner and outer sheath temperatures and thus in differential expansion.

Both factors are extremely complex and consequently the philosophy adopted is to accept that there will be differential expansion and to design for it. The present invention lies in the measures provided in this respect.

SUMMARY OF THE INVENTION

According to the invention, an elongate tubular fuel pin having its outer and inner sheaths sealingly secured together at one end of the fuel pin, includes first sealing means for sealing the other ends of the sheaths together whilst permitting relative longitudinal movement therebetween, thereby providing a sealed enclosure between the sheaths, second sealing means for sealing the sheaths together whilst permitting relative longitudinal movement therebetween, said second sealing means being disposed in spaced adjacent relationship with said first sealing means, and means providing a duct venting to the outside of the fuel pin the space between said sheaths which is bounded by said first and second sealing means.

The said first and second sealing means are preferably each constituted by a bellows seal.

The said duct preferably extends in close relationship to said fuel pin and to a position remote from the region of said first and second sealing means. The duct preferably provides a vent path longer than the length of the fuel pin.

The said duct is preferably a capillary tube communicating at one end with said space at a position between the two sealing means, being wrapped helically around said outer sheath and terminating open ended at that end of the fuel pin which is remote from said first and second sealing means. The helically wound tube serves, in conjunction with the corresponding tubes of adjacent pins, as a spacer for the pins, and promotes mixing of the coolant flowing over the pins. The helically wound tube also gives a capillary length longer then the fuel length for attenuation of fission products by decay of the short-lived ones.

DESCRIPTION OF THE DRAWING

In order that the invention may be fully understood, a constructional example thereof will now be described with reference to the accompanying drawings, wherein:

FIGS. 2, 3 and 4 are plan views in section on lines II—II, III—III and IV—IV respectively, and FIG. 5 is a fragmentary elevation, drawn to a smaller scale than that of FIG. 1, of the fuel pin shown in FIG. 1.

DESCRIPTION OF THE PREFERRED EMBODIMENT

Figure 1:
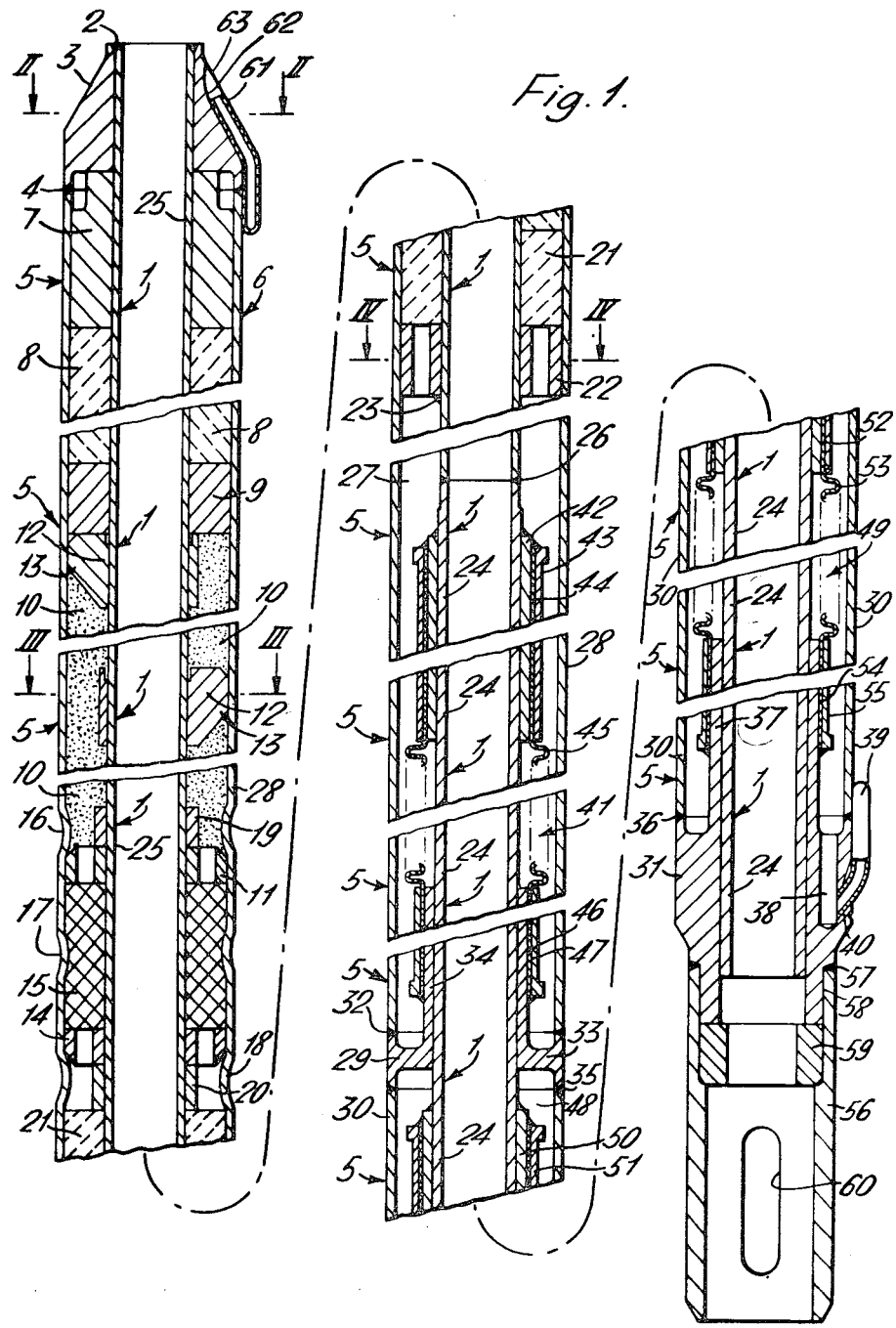
FIG. 1 is a fragmentary side view in medial section of a nuclear fuel pin in accordance with the invention.

Referring to the drawings, in the construction shown therein as applied by way of example to a nuclear reactor fuel pin intended to be employed with a multiplicity of similar fuel pins in a fuel sub-assembly to be employed with a multiplicity of similar sub-assemblies in proximity to form the core of a fast breeder nuclear reactor cooled by liquid metal such as sodium, we provide an elongate, inner tubular sheath 1 of stainless steel and having secured to it by annular edge welding at 2 an upper end fitting 3 also of stainless steel and to which is also secured, by butt welding at 4, an elongate outer tubular sheath 5 of stainless steel and extending coaxially with the sheath 1 to form an elongate fuel pin 6 having between its sheaths 1 and 5 an annular space, the upper portion of which generally contains nuclear fuel and breeder material and the lower portion of which is generally speaking a void and serves to accommodate gaseous fission products arising from irradiation of the nuclear fuel in the highly rated core region of the nuclear reactor.

The end fitting 3 has abutting it an annular distance piece 7 (this could be a spring or knitmesh element for fuel hold-down) of stainless steel and disposed between and in contact with the sheaths 1 and 5. A column of stacked annular pellets 8 of breeder fuel is disposed between the distance piece 7 and an annular stainless steel separator 9. Beneath the separator 9 is the fissile fuel 10 constituting, with the equivalent regions of the other fuel pins mounted in a fuel sub-assembly and with the other fuel assemblies hereinbefore referred to, the core region of the nuclear reactor. The fissile fuel 10 is in the form of vibro-compacted particles of mixed $UO_2$ and $PuO_2$ occupying the annular space between the separator 9 and an apertured platform 11 of molybdenum. The fissile fuel 10 has five spacers 12 of stainless steel (two only being shown in FIG. 1) disposed equidistantly along the length of this region. The spacers 12 are of the form shown in FIG. 3 and are so arranged that adjacent spacers 12 have their three projections 13 staggered relative to each other. The spacers 12 provide a measure of prevention against fuel slumping after inadvertent overheating by acting as chills. They furthermore ensure the concentricity of the inner and outer sheaths in the main fuel region.

Between the platform 11 and a similar but inverted platform 14 spaced therefrom is a body 15 of molybdenum knitmesh. The apertures in the platforms 11, 14 allow gaseous fission products produced in the fuel by irradiation to escape therefrom; the knitmesh body 15, as well as acting as a barrier to loss of particles of fuel during vibro-compaction and pre-operation handling, retains any solid fission products or particles of fuel which may have become separated from the mass of fuel 10 and become entrained in a flow of gaseous fission products from the mass of fuel 10. The outer sheath 5 is inwardly swaged or otherwise inwardly deformed at 16 to locate the platform 11, at 17 to locate the knitmesh body 15, and at 18 to locate the platform 14.

Spacing rings 19, 20 are disposed adjacent to platforms 11, 14 respectively. Spacing ring 19 extends into the mass of fuel 10 and serves to locate the platform 11 during assembly, whereas spacing ring 20 serves to locate the upper end of a column of annular breeder fuel pellets 21, the lower end of which is supported by an apertured retaining ring 22 which is tack welded at 23 to the inner sheath 1. The ring 22 terminates the fuel-containing portion of the fuel pin.

The remainder of the fuel pin serves largely as a reservoir 27 for gaseous fission products and also contains sealing means and venting means. The lower end portion 24 of the inner sheath 1 is thicker than and formed separately from the upper end 25 and is butt welded thereto at 26; this is mainly because the upper end 25 is a pressure retaining component and would be weakened if it had bodies secured to its as does the portion 24; it further facilitates assembly. Furthermore, the lower end portion of the outer sheath 5 is formed in three parts 29, 30 and 31 respectively; the main reason for this is to facilitate assembly. It should be noted that the main length 28 of the outer sheath 5 extends downwardly well past the welded joint 26 of the inner sheath parts. The lower end of the main length 28 of the outer sheath 5 is butt welded at 32 to a flange 33 of the part 29. The latter also has a sleeve part 24 which is a clearance fit on the part 24 of the inner sheath 1. The flange 33 is butt welded at 35 to the upper end of the part 30 of the outer sheath 5. The lower end of the part 30 is butt welded at 36 to the part 31 of the outer sheath 5, the part 31 also having a sleeve part 37 which is a clearance fit on the part 24 of the inner sheath 1. The part 31 is solid up to the part 24 and forms a termination of the lower portion of the annular space between the sheaths 1 and 5. In this solid portion is a single longitudinal bore 38 with which one end of a long capillary tube 39 communicates via an inclined aperture 40 in which the end of the tube 39 is secured by brazing. The tube 39 will be referred to in more detail hereafter.

The part 24 of the inner sheath 1 has its lower end a clearance fit within the sleeve part 37 of the outer sheath part 31, as aforesaid. Thus differential expansion between the inner sheath 1 and the outer sheath 5 can take place with relative sliding movement between the parts 24 and 37. However, the philosophy of this fuel pin envisages that the reservoir 27 for gaseous fission products arising from the mass of fuel 10 needs to be sealed to retain the fission products in the reservoir 27. In order to effect this sealing, bearing in mind the likelihood of relative movement between the inner sheath 1 and the outer sheath 5, a bellows seal 41 is provided and consists of spaced coaxial sleeve parts 42 and 43 welded to the part 24 of the inner sheath 1 just below the welded joint 26 and trapping between them the upper cylindrical part 44 of bellows 45, the lower cylindrical part 46 of which is trapped between a sleeve part 47 welded to the sleeve part 34 of the outer sheath part 29. Whilst the bellows seal 41 remains effective, the reservoir 27 remains sealed and the fuel pin is of sealed plenum type.

Should the bellows seal 41 fail, then gas will be able to leak from the reservoir 27 into the void existing beneath the seal 41 and constituted by the annular space 48 between the inner sheath part 24 and the outer sheath part 30 in this region. To ensure that fission product gas reaching this space 48 cannot leak out of the fuel pin at the lower end by passing between the inner sheath part 24 and the sleeve part 37 of the outer sheath part 31, these parts being a clearance fit, a further bellows seal designated 49 is provided, being constituted similarly to the seal 41, namely by coaxial sleeve parts 50, 51 secured to the inner sheath part 24 and trapping between them the upper cylindrical part 52 of bellows 53 whose lower cylindrical part 54 is trapped between a sleeve part 55 secured to the sleeve part 37 of the part 31 of the outer sheath 5.

The lower end of the fuel pin 6 is constituted by a tubular end fitting 56 butt welded at 57 in a recess 58 in the part 31. An orifice plate 59 is mounted in the bore of the fitting 56, the orifice area being chosen to control the flow of coolant which can flow inside the inner sheath 1. For example, fuel pins in the outer region of the cluster of fuel pins in a fuel sub-assembly could have a larger orifice area than that of the fuel pins in the central region of said cluster. The end fitting 56 has opposed slots 60 in its tubular wall to provide extra access for coolant to reach the interior of the inner sheath 1.

It is undesirable for gaseous fission products to be discharged to the surrounding coolant at the lower end of the fuel pin for a number of reasons, the most important being the fact that at the lower end of the fuel pin, the pressure head of the coolant is higher than at the upper end (since coolant flow is upwardly) and thus there is more likelihood, particularly during early operation, of coolant entering the fuel pin and reaching the fuel rather than gaseous fission products forcing their way out. It is also important to avoid having bubbles of fission product gas in the coolant flowing over the core. The vent tube 39 previously referred to provides for gaseous fission products to be discharged to the coolant at the upper end of the fuel pin. This tube is helically wound around the exterior of the outer sheath 5 and terminates at an orifice facing upwardly and sloping towards the axis of the fuel pin, this being accomplished by securing the upper end 61 of the tube 39 in a recess 62 in an inwardly sloping part 63 of the upper end fitting 3 of the fuel pin 6. Most importantly, the helically wound tube 39 serves, by engagement with the outer sheaths of adjoining fuel pins, to space the fuel pins. Its long length also serves to attenuate fission product activity by providing a long capillary path for decay of short-lived fission products. The helically wound tube 39 can best be seen in FIG. 5 and can also be seen in FIGS. 2, 3 and 4, FIG. 1 showing only its beginning and end.

Instead of the mass of fuel 10 being constituted by vibro-compacted fuel, it may as an alternative be constituted by a column of stacked annular fuel pellets preferably interposed with a number of spaced annular members to ensure concentricity between inner and outer sheaths in the fuel region.

A significant advantage of the hereinbefore described fuel pin is the fact that the provision of the helical vent tube permits a fission product gas plenum to be provided at the cool end of the fuel pin, where a greater mass of gas per unit volume can be stored at a given pressure, whilst being able to vent, should the bellows 41 fail, to the outflow end of the fuel pin, for the desirable reasons stated.

We claim:

1. For a nuclear reactor, an elongate tubular fuel pin comprising inner and outer sheaths with nuclear fuel material contained in the annular space between the sheaths, the inner and outer sheaths being sealed together at one end of the fuel pin, the nuclear fuel material terminating in the annular space between the sheaths short of the second end of the fuel pin, first sealing means comprising a flexible member which allows relative longitudinal movement between the inner and outer sheaths and which seals the annular space between the inner surface of the outer sheath and the outer surface of the inner sheath at a position longitudinally spaced from the point of termination of the nuclear fuel material between the sheaths in the direction towards the second end of the fuel pin, second sealing means comprising a flexible member which allows relative longitudinal movement between the inner and outer sheaths and which seals the annular space between the inner surface of the outer sheath and the outer surface of the inner sheath at a position longitudinally spaced from the position of said first sealing means in the direction towards the second end of the fuel pin, and a duct for venting to the outside of the fuel pin the annular space between the sheaths which is bounded by said first and second sealing means.

2. A fuel pin according to claim 1, wherein said first and second sealing means are each constituted by a bellows seal.

3. A fuel pin according to claim 1 wherein said duct extends along the length of the fuel pin from said second end of the fuel pin to a position at said one end of the fuel pin.

4. A fuel pin according to claim 3, wherein said duct provides a vent path longer than the length of the fuel pin.

5. A fuel pin according to claim 1 wherein said duct is a capillary tube one end of which communicates through the outer sheath with said annular space between the sheaths which is bounded by the first and second sealing means and said tube is wrapped helically around the outside of the outer sheath and terminates open-ended at said one end of the fuel pin.

References Cited

UNITED STATES PATENTS

| | | | |
|---|---|---|---|
| 3,018,239 | 1/1962 | Happell et al. | 176—49 |
| 3,105,037 | 9/1963 | Weems | 176—83 X |
| 3,202,583 | 8/1965 | Salesse et al. | 176—83 X |
| 3,231,476 | 1/1966 | Thome | 176—83 X |
| 3,340,154 | 9/1967 | Sinclair et al. | 176—87 X |
| 3,365,372 | 1/1968 | Swanson et al. | 176—83 X |
| 3,403,076 | 9/1968 | Bettis | 176—49 X |
| 3,399,112 | 8/1968 | Dodd | 176—79 |

CARL D. QUARFORTH, Primary Examiner

G. G. SOLYST, Assistant Examiner

U.S. Cl. X.R.

176—79, 81, 83